(12) United States Patent
Dillon et al.

(10) Patent No.: US 7,272,409 B2
(45) Date of Patent: Sep. 18, 2007

(54) METHOD AND APPARATUS FOR SETTING PILOT SIGNAL TRANSMIT POWERS

(75) Inventors: Matthew James Dillon, Hawthorn Woods, IL (US); Simon Brusch, Oxon (GB); Chris Murphy, Bath (GB); Jonathan Neil Hopkinson, Corsham (GB)

(73) Assignee: Motorola, Inc., Schaumburg, IL (US)

( * ) Notice: Subject to any disclaimer, the term of this patent is extended or adjusted under 35 U.S.C. 154(b) by 149 days.

(21) Appl. No.: 10/476,673

(22) PCT Filed: Feb. 25, 2002

(86) PCT No.: PCT/EP02/02143

§ 371 (c)(1),
(2), (4) Date: May 18, 2004

(87) PCT Pub. No.: WO02/091621

PCT Pub. Date: Nov. 14, 2002

(65) Prior Publication Data

US 2004/0198408 A1 Oct. 7, 2004

(30) Foreign Application Priority Data

May 4, 2001 (GB) .................................. 0111001.4

(51) Int. Cl.
*H04Q 7/20* (2006.01)
*H04Q 11/12* (2006.01)
*H04B 7/00* (2006.01)

(52) U.S. Cl. .................. 455/522; 455/436; 455/127.1; 455/69

(58) Field of Classification Search ................ 455/522, 455/127.1, 437, 69, 439, 127.5, 33, 422, 455/436; 370/331, 320, 335
See application file for complete search history.

(56) References Cited

U.S. PATENT DOCUMENTS

| 6,157,668 | A | * | 12/2000 | Gilhousen et al. | .......... | 375/130 |
| 6,167,282 | A | | 12/2000 | Hunsberger | | |
| 6,285,664 | B1 | * | 9/2001 | Bernstein et al. | .......... | 370/318 |
| 6,473,614 | B1 | * | 10/2002 | Quensel et al. | ............. | 455/436 |

OTHER PUBLICATIONS

Dongwoo, K. et al. "Pilot Power Control and Service Coverage Support in CDMA Mobile Systems," *Vehicular Technology Conference*, 1999 IEEE, pp. 1464-1468.

* cited by examiner

*Primary Examiner*—Tilahun Gesesse

(57) ABSTRACT

The invention relates to a method and apparatus for setting pilot signal transit powers in a CDMA system. Subscriber units (211,213,215) perform pilot signal measurement measurements and transmits these to a receiver (603). A processor (605) determines a ranking factor for each cell (217, 219,221) at least partly dependent on the pilot signal measurement and a cell overlap condition of the subscriber unit (211, 213, 215) during measurements. The processor (605) ranks the cells (217,219,221) according to the ranking factor, and sets the pilot signal transmit power of at least one cell in response to the ranking of the cells by adjusting a power amplifier (609). The cell overlap condition is determined as the handover state of the subscriber unit (211,213, 215) or as the number of cells, which can be received by the subscriber unit (211,213,215) during the measurement The invention is applicable to 3rd generation cellular communication systems.

18 Claims, 3 Drawing Sheets

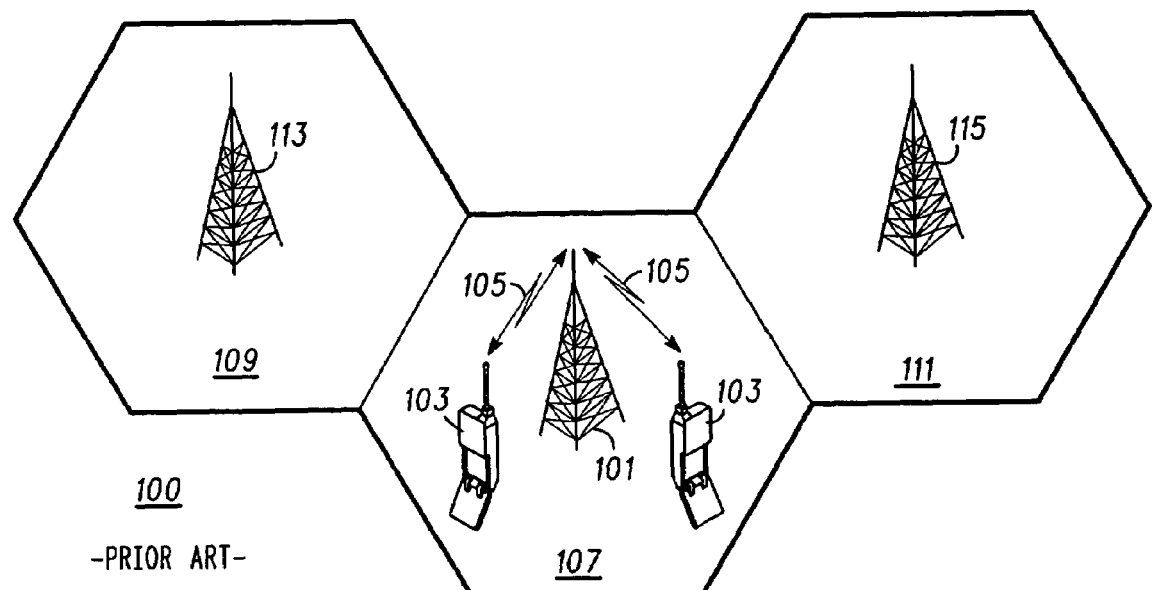
FIG. 1 —PRIOR ART—
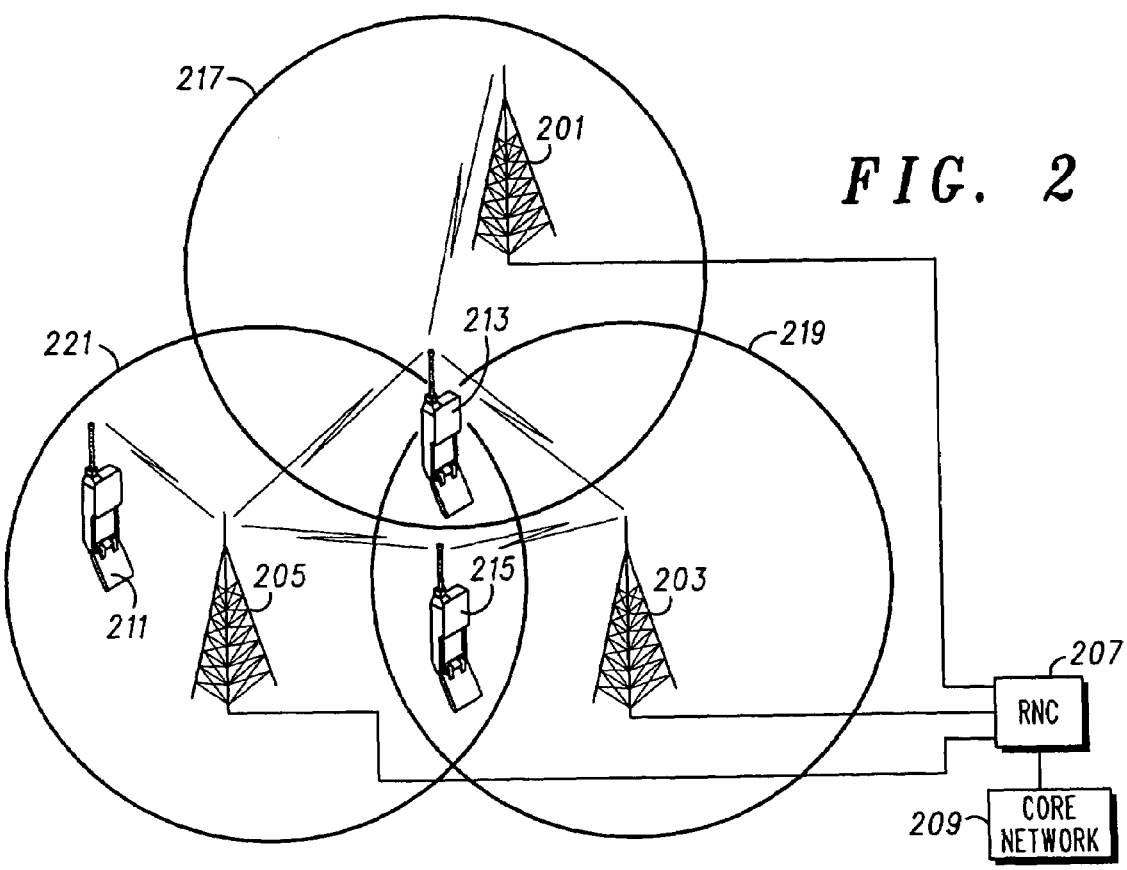
FIG. 2

| PILOT | RANKING FACTOR | CONVERGE? (Y/N) | PILOT POWER BEFORE (dBm) | CHANGE IN PILOT POWER (dBm) | PILOT POWER AFTER (dBm) |
|---|---|---|---|---|---|
| 288 | −16.780 | NO | 31.77 | −0.68 | 31.44 |
| 88 | −10.654 | YES | 28.03 | 0 | 28.03 |
| 384 | −10.421 | NO | 30.67 | −0.42 | 30.46 |
| 388 | −8.884 | NO | 30.84 | −0.36 | 30.66 |
| 212 | −5.122 | NO | 31.09 | −0.20 | 30.98 |
| 172 | −2.417 | NO | 28.39 | −0.10 | 28.35 |
| 152 | −0.413 | YES | 29.60 | 0 | 29.60 |
| 256 | −0.202 | NO | 28.83 | −0.00 | 28.82 |
| 92 | +2.263 | NO | 30.60 | +0.10 | 30.64 |
| 440 | +2.466 | NO | 28.29 | +0.10 | 28.34 |
| 128 | +3.608 | NO | 31.59 | +0.14 | 31.67 |
| 120 | +7.069 | NO | 31.29 | +0.28 | 31.43 |
| 332 | +9.050 | YES | 28.08 | +0.36 | 28.26 |
| 12 | +39.095 | NO | 29.08 | +1.56 | 29.86 |
| 280 | +83.220 | NO | 31.37 | +2.00 | 33.00 |

METHOD AND APPARATUS FOR SETTING PILOT SIGNAL TRANSMIT POWERS

FIELD OF THE INVENTION

This invention relates to a method and apparatus for setting pilot signal transmit powers in a Code Division Multiple Access cellular communication system.

BACKGROUND OF THE INVENTION

In a cellular communication system, each of the subscriber units (typically mobile stations) communicates with typically a fixed base station. Communication from the subscriber unit to the base station is known as uplink and communication from the base station to the subscriber unit is known as downlink. The total coverage area of the system is divided into a number of separate cells, each predominantly covered by a single base station. The cells are typically geographically distinct with an overlapping coverage area with neighbouring cells. FIG. 1 illustrates a cellular communication system 100. In the system, abase station 101 communicates with a number of subscriber units 103 over radio channels 105. In the cellular system, the base station 101 covers users within a certain geographical area 107, whereas other geographical areas 109, 111 are covered by other base stations 113, 115. Some overlap areas 117 can be covered by more than one cell.

As a subscriber unit moves from the coverage area of one cell to the coverage area of another cell, the communication link will change from being between the subscriber unit and the base station of the first cell, to being between the subscriber unit and the base station of the second cell. This is known as a handover. Specifically, some cells may lie completely within the coverage of other larger cells.

All base stations are interconnected by a fixed network. This fixed network comprises communication lines, switches, interfaces to other communication networks and various controllers required for operating the network. A call from a subscriber unit is routed through the fixed network to the destination specific for this call. If the call is between two subscriber units of the same communication system the call will be routed through the fixed network to the base station of the cell in which the other subscriber unit currently is. A connection is thus established between the two serving cells through the fixed network. Alternatively, if the call is between a subscriber unit and a telephone connected to the Public Switched Telephone Network (PSTN) the call is routed from the serving base station to the interface between the cellular mobile communication system and the PSTN. It is then routed from the interface to the telephone by the PSTN.

A cellular mobile communication system is allocated a frequency spectrum for the radio communication between the subscriber units and the base stations. This spectrum must be shared between all subscriber units simultaneously using the system.

One method of sharing this spectrum is by a technique known as Code Division Multiple Access (CDMA). In a Direct Sequence CDMA (DS-CDMA) communication system, the signals are prior to being transmitted multiplied by a high rate code whereby the signal is spread over a larger frequency spectrum. A narrowband signal is thus spread and transmitted as a wideband signal. At the receiver, the original narrowband signal is regenerated by multiplication of the received signal with the same code. A signal spread by use of a different code will not be de-spread by the receiver but will remain a wide band signal and removed by filtering after the de-spreading operation. In the receiver, the majority of interference caused by interfering signals received in the same frequency spectrum as the wanted signal can thus be removed by filtering. Consequently, a plurality of subscriber units can be accommodated in the same wideband spectrum by allocating different codes for different subscriber units. Codes are chosen to minimise the interference caused between subscriber units typically by choosing orthogonal codes when possible. A further description of CDMA communication systems can be found in 'Spread Spectrum CDMA Systems for Wireless Communications', Glisic & Vucetic, Artech house Publishers, 1997, ISBN 0-89006-858-5. Examples of CDMA cellular communication systems are IS 95 standardised in North America and the Universal Mobile Telecommunication System (UMTS) currently under standardisation in Europe.

Each base station transmits a pilot signal, which can be received by the subscriber units. A subscriber unit measures the pilot signal level of the transmitted pilot signal from a number of surrounding base stations. Each base station furthermore transmits information of neighbouring base stations enabling the subscriber unit to search for the pilot signals of these cells. The subscriber unit reports the measured signal values back to the network and the preferred serving cell or cells is chosen based at least partly on these levels. In the simplest form, the serving cell is chosen as the cell whose pilot signal is received at the highest level, as this will maximise the quality of the transmissions between the subscriber unit and the base station with the least cost in terms of power. In this case, a subscriber unit served by another cell will be handed over to this cell. In a real communication system, such as UMTS, more complex algorithms are used which may take into account factors such as the bit error rate of an ongoing communication, the time (handover margin) etc. However, the measured pilot signal strength is one of the most important parameters considered in determining a serving cell (or cells) whether for hand over or for system access.

Spread spectrum systems offer high capacity by allowing a frequency reuse factor of one. This means that each cell transmits on the same frequency. While, this allows maximum usage of the radio spectrum, it causes each cell to be an interference source to every other cell within its transmission range. In an interference limited spread spectrum system the major loss of available capacity is multiple pilot interference. This is the case where not only the serving cell and its adjacent neighbour provide coverage to a mobile between these cells, but other unwanted cells also degrade the area with their signals. Normally, this is taken care of by drive testing and making small incremental changes in order to try to reduce these multiple pilot regions. However, this is resource intensive and requires skilled personnel. A second method of reducing these multiple pilot regions is based on simulations during the planning stages. However, this solution is impaired by the lack of accurate path-loss propagation tools as well as simulation assumptions of operation performance, traffic distribution e.t.c., which do not track mobile performance in the field very well.

There is thus a need for an improved system for setting of pilot signals transmitted by base stations in a cellular communication network.

SUMMARY OF THE INVENTION

The invention seeks to provide an improved system for setting pilot signal transmit powers.

Accordingly, there is provided a method of setting pilot signal transmit powers in a CDMA cellular communication system comprising the steps of: receiving pilot signal measurements from at least one measurement receiver and from a plurality of locations, the pilot measurements relating to pilot signals from more than one cell; for a plurality of cells, determining a ranking factor for each cell at least partly dependent on the pilot signal measurements and a cell overlap condition of the measurement receiver during measurements; ranking the cells according to the ranking factor; and setting the pilot signal transmit power of at least one cell in response to the ranking of the cells.

According to a second aspect of the invention, there is provided an apparatus for setting pilot signal transmit powers in a CDMA cellular communication system comprising: means for receiving pilot signal measurements from at least one measurement receiver and from a plurality of locations, the pilot measurements relating to pilot signals from more than one cell; means for determining for a plurality of cells a ranking factor for each cell at least partly dependent on the pilot signal measurements and a cell overlap condition of the measurement receiver during measurements; means for ranking the cells according to the ranking factor; and means for setting the pilot signal transmit power of at least one cell in response to the ranking of the cells.

Preferably determining a ranking factor comprises evaluating a plurality of pilot signal measurements and for each pilot signal measurement determining a preference value dependent on the pilot signal measurement and a cell overlap condition of the measurement receiver during measurement; and determining the ranking factor in response to the preference values of the measurements.

According to a feature of the invention the preference value of each measurement depends on pilot signal measurement of the pilot signal of the cell being ranked relative to pilot signals measurements for other cells and on the time between measurement reports for that measurement receiver.

BRIEF DESCRIPTION OF THE DRAWINGS

An embodiment of the present invention is described below, by way of example only, with reference to the Drawings, in which:

FIG. 1 is an illustration of a cellular communication system according to prior art;

FIG. 2 shows an example of a UMTS cellular communication system;

DETAILED DESCRIPTION OF A PREFERRED EMBODIMENT

Figures 3, 4:
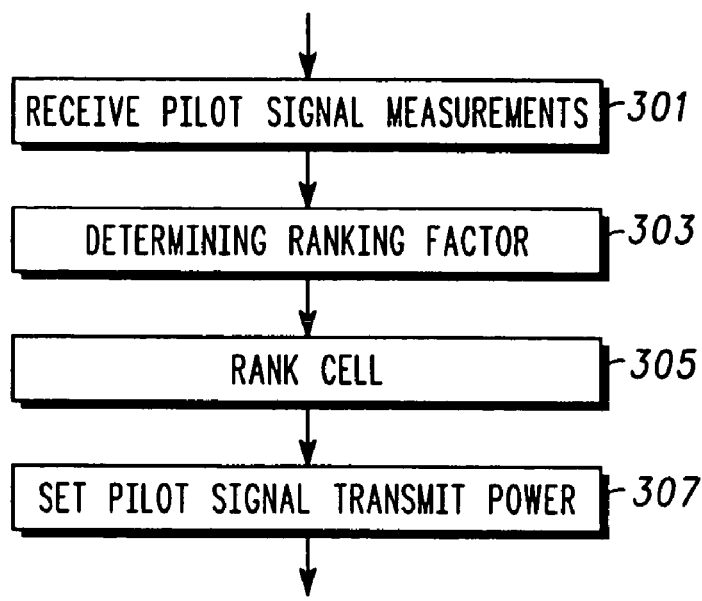
FIG. 3 illustrates a method of setting pilot signal transmit powers in accordance with an embodiment of the invention.
FIG. 4 illustrates a specific example of the calculation of a ranking factor for a cell in accordance with an embodiment of the invention.

The following description focuses on an embodiment compliant with the current approach for the standardisation of UMTS. However, it will be clear to the skilled person that the invention is not limited thereto.

FIG. 2 shows an example of a UMTS cellular communication system. A number of base stations (or in UMTS terminology 'Node B's') 201,203,205 are connected to a controller (known as a Radio Network Controller, RNC, in UMTS). The RNC is connected to a core network 209, which is connected to other RNC's and other networks, including the fixed line telephone network. Each of the base stations supports subscriber units 211, 213, 215 in their respective cells 217, 219, 221. A subscriber unit 211 making a call will establish a communication link 223 with a serving base station 205. The data from the subscriber unit 211 will be communicated over this communication link 223 to the base station 205 and therefrom routed to the destination, typically through the RNC 207 and the core network. Further description of the UMTS CDMA cellular communication system can be found in "WCDMA for UMTS, edited by Harri Holma and Antti Toskala, Wiley, 2000, ISBN 0-471-72051-8"

For some areas, the geographical and the network layout is such that a subscriber unit can be served by more than one base station. In CDMA systems, subscriber units in such an overlap area are typically served by a plurality of based stations simultaneously. In the example of FIG. 2, the subscriber unit 215 is in an overlap area where it can be served by base station 203 and 205. In this case, communication links are set up between the subscriber unit 215 and the base station 203 as well as between the subscriber unit 215 and the base station 205. The data from the subscriber unit 215 is transmitted simultaneously over both these communication links and is routed from the base stations 203, 205 to the RNC 207 where they are combined. Likewise, data transmitted to the subscriber unit 215 is routed to both base station 203 and base station 205 and be transmitted from both base stations to the subscriber unit 215. In this case, the subscriber unit 215 will combine the received downlink data streams from the two individual communication links.

A subscriber unit, which is very close to a base station 205 will initially be served by only this base station. As it moves towards another base station 203, it will enter the overlap area and a communication link with this base station 203 will be set up. The subscriber unit is thus supported simultaneously by two base stations. As it continues to move towards the base station 203, the subscriber unit will exit the overlap area and the initial communication link with the first serving base station 205 will be closed down so that the subscriber unit is only served by the second base station 203. This sequence is known as a soft handover and a subscriber unit being supported by more than one base station is known as being in a soft handover. A soft handover may involve more than two base stations as shown for subscriber unit 213 which has simultaneous communication links with all three base stations 201, 203, 205 as it is situated in an overlap area between three cells 217, 219, 221. A subscriber unit in an overlap area may only be in soft handover with a subset of the possible sets or may not be in a soft handover but be served by only one cell.

In order for the communication links to be set up properly, it is necessary to determine which subscriber units are within the coverage area of which base stations. To this effect, the base stations transmit pilot signals. A pilot signal is typically transmitted omni-directionally from the base station using a known pilot spreading code. This enables subscriber units detecting pilot signal by de-correlating the received signal with the desired pilot spreading code. By measuring the signal level of the de-correlated signal a received signal level of the desired pilot tone can be determined. The spreading code varies between cells, and therefore the subscriber unit can independently receive the pilot signal of both the serving cell (or cells) and of neighbour cells. The pilot spreading code for different cells is communicated to the subscriber units on control channels of the serving cell.

The pilot signal level measurements are used in determining the best target cell when accessing the system, i.e. it is used by the subscriber unit to determine which base station to transmit a system access request to. In addition, the pilot signal level measurements are used to determine a list of potential handover candidates and which cells should be used for serving the cell, i.e. to which base stations a communication link should be set up. The set of base stations supporting the mobile station at any given point in time is known as the active set. In addition the set of base stations being measured but not active in a soft handover is known as the candidate set.

The transmitted powers of the pilot signals therefore influence where handover between cells occur. The stronger the transmitted pilot signal power, the further away from the base station a handover to the base station will be instigated, and the lower the transmitted pilot signal power the closer to the base station the subscriber unit will have to be before a hand over to that base station is instigated. The effective cell size for a base station will thus be dependent on the transmitted pilot signal power and by adjusting the transmitted power the cell and overlap areas can be modified.

For UMTS, handovers are network originated which means that the decision to set up or close down a communication link between a subscriber unit and base station is made in the RNC. As the decision is partly dependent on the pilot signal level measured at the subscriber unit, the subscriber unit transmits measurement reports to the network. These measurement reports include the measured pilot signal level of the serving cell or cells, as well as other cells, which may be potential candidates for soft handover.

Since each cell transmits on the same frequency in a CDMA system each cell is an interference source to every other cell within its transmission range. In an interference limited spread spectrum system, the major loss of available capacity is multiple pilot interference. This is the case where not only the serving cell and its adjacent neighbour provide coverage to a mobile between these cells, but other unwanted cells also degrade the area with their signals. It is therefore desirable to carefully adjust the pilot signal transmit powers, and thereby the overlap areas, such that capacity of the system is maximised while maintaining sufficient coverage.

FIG. 3 illustrates a method of setting pilot signal transmit powers in accordance with an embodiment of the invention.

It will be clear to the person skilled in the art that the method can be implemented in a base station or RNC but could in principle be implemented in any suitable processing device including being distributed over a number of network elements, be implemented in a dedicated network element and/or be in the core network. The following description focuses on an implementation in an RNC but it will be clear that the invention is not limited thereto. Alternative locations include the Operation and Management Centre or other core element devices.

In step 301 pilot signal measurements are received from at least one measurement unit and from a plurality of locations. These pilot signal measurements are in the preferred embodiment transmitted from the subscriber units in an active network. According to the UMTS standard, subscriber units continually measure the received pilot signal level from a number of cells including serving cells and neighbour cells. The frequency and thresholds of the measurement reports are however configurable. Thus, a more periodic and comprehensive pilot set can be configured in order to support this algorithm. These levels are reported back to the base station through measurement report messages. In the preferred embodiment a large number of measurements are received and processed in the following steps 303, 305 and 307.

In the preferred embodiment, the pilot signal measurements are measurements of the received pilot signal level but alternatively other pilot signal measurements or a combination of these can be used. Such measurements include for example pilot signal error rates or the relative order of received signal strength between pilot signals received.

Also the measurements can be made by any suitable measurement receiver and may not necessarily be made in an active system. For example, the invention is equally applicable to pilot signal measurements obtained from a single dedicated measurement receiver during drive testing of a non-operational network.

The plurality of pilot signal measurements received in step 301 is in step 303 used in determining a ranking factor for a plurality of cells. The ranking factor is determined in response to the pilot signal measurements and a cell overlap condition of the measurement receiver during measurements.

The cell overlap condition of the measurement receiver depends on the overlap between the cells in the location where the measurement receiver is performing the measurement. In the preferred embodiment, it is determined as the number of pilot signals that the measurement receiver can receive over a certain threshold (which may be the noise floor of the receiver thereby including all pilot signals that can be received). The cell overlap condition will in this case include all cells contained in the active set (i.e. in an active handover) and in the candidate set (i.e. cells which are received and but not currently active in a hand over). Also a measurement receiver may not actively be communicating with the communication system but simply measure the pilot signals received at a given location and determine the cell overlap condition as equal to the number of pilot signals received in this area.

In another embodiment, the cell overlap condition is determined as the handover state of the measurement receiver during measurement. If the measurement is a subscriber unit in a call, the cell overlap condition may simply be determined as the number of cells involved in supporting the communication i.e. 1 if no handover is ongoing and 2,3,4 etc if a soft handover is ongoing dependent on how many cells are active in the handover.

In the preferred embodiment, the ranking factor of each cell is determined by evaluating a plurality of pilot signal measurements. For each pilot signal measurement, a preference value is determined which is dependent on the pilot signal measurement itself and on a cell overlap condition of the measurement receiver during measurement.

Based on the ranking factor determined for each of the plurality of cells, the cells are ranked in step 305.

Finally, in step 307 the pilot signal transmit power of the cells is set or adjusted in response to the ranking of the cells.

The method can be applied to the whole network or to a smaller subset of cells.

Furthermore, the pilot signal transmit power of all cells can be set by this method or it can be used to set or adjust only a subset of the cells considered.

The method can be iterated and thereby used to dynamically adjust the pilot signal transmit powers in a communication system. It will also be clear to the skilled person that the individual steps are not necessarily sequential but that they can be performed in parallel or when ever sufficient data is available. Also each of the steps can be iterated as frequently as desired independently of the iteration frequency of the other steps. For example each or all of the steps of determining a ranking factor, ranking the cells and setting an pilot signal transmit power can be performed whenever a new measurement is received. Alternatively each step could for example be performed at predetermined intervals, such that the step of determining a ranking factor may be performed at hourly intervals whereas the ranking of the cells and the setting of pilot signal transmit powers may be at daily intervals in order to minimise the disruption to the system.

The embodiment described thus provides a method for setting the pilot signal transmit powers in response to measurements of the pilot signals and the cell overlap condition of the receiver during the measurements. Since the pilot signal measurements relate to the transmitted pilot signal power and the cell overlap condition relate to the amount of overlap between cells at the position of the measurement receiver at measurement (and thus relate to pilot signal interference), the invention provides an efficient method for setting the pilot signal transmit power such that a desired overlap between cells is obtained. The invention thus provides a method for reducing pilot signal interference while maintaining coverage.

FIG. 4 illustrates a specific example of the calculation of a ranking factor for a cell in accordance with a preferred embodiment of the invention.

For each cell an array is defined having a column for each cell overlap condition, i.e. a column for the measurement receiver or subscriber unit during measurement being served by a single cell, another column for the subscriber unit being in a soft handover with two cells, a third for the subscriber unit being in handover with three cells etc. In addition the measurements may relate to cells not involved in a soft handover such as candidate cells, which are used to fill in the columns as well. The array consists of active and candidate cells in order to capture information on all possible signals in mobile's environment.

The array is defined having a row for each possible relative pilot signal strength of the cell being ranked. Hence, the first row relates to a measurement where the given cell is reported as the strongest pilot signal level, the second row is where the cell is the second strongest etc.

In the preferred embodiment, when a measurement is received it is evaluated for each cell included in the measurement report what the relative signal strength of that cell is and what the cell overlap condition is. An entry into the corresponding cell of the array for that cell is then made by adding a preference value to the current value of the cell.

As a specific example a measurement may be received with the pilot signals levels of cell A,B,C and D of A=−6, B=−8, C=−10, D=−12. In the example the measurement receiver is in a three way soft handover with cell A being the strongest, cell B the second strongest and cell C the third strongest. In addition it can receive cell D which is part of the candidate set and the weakest of the four. Accordingly, a preference value entry is made to the fourth column, first row in the array of cell A, the fourth column and second row for cell B, fourth column and third row for cell C and finally in the fourth column and fourth row for cell D.

The preference value entered or added to the existing value can depend on a number of factors. First of all, desired conditions such as dominance and a limited number of soft handover legs get positive reinforcement, while the relatively weak pilot conditions such as those areas where a pilot is low on the list of a multiple way handoff are negatively weighted.

FIG. 4 illustrates how the preference value accordingly depends on which cell the entry is in such that cells towards row 1 and column 1 have very high preference values, whereas cells for increasing column and row numbers have lower preference values including negative values. The negatively weighted pilots get stronger multipliers at the bottom of multiple pilot regions so that they can be turned down, increasing capacity by removing pilots not needed in the area. Pilots that show strong dominance (i.e. serve subscriber unit without requiring soft handovers with many cells) are increased in order to increase capacity by recognising their ability to provide clean coverage since the base station transmits less power, and thus less interference, to fulfill the same quality level of the communication.

In the preferred embodiment of a UMTS system, measurement reports are received when a change occurs in the handover state or transitions in the various thresholds in active set or candidate set for the subscriber unit. Therefore, the time between measurements relate to how long a certain hand over state has occurred and the preference value is therefore determined in relation to this time between measurements, such that the longer the interval the higher the preference value a desired hand over state but the lower the preference value for a non-desired hand over state.

The ranking factor for a cell is in the preferred embodiment determined as the summation of the preference values of all cells in the array, i.e. as $$RankingFactor = \sum_n \sum_i k_{n,i} \cdot T_{n,i}$$

wherein n ranges over all cells in the array, i ranges over the number of measurements contained in each cell n, k is the preference value relating to the cell overlap condition and relative strength, and T is the time between measurements.

In an equivalent implementation, only data related to time between measurements are stored in the array and the impact on the preference value of the cell overlap condition and relative strength is done by weighting each cell in the array when determining the ranking factor. The ranking factor is thus determined as the summation according to:

$$RankingFactor = \sum_n k_n \sum_i T_{n,i}$$

However, as k only depends on the cell overlap condition and the relative pilot signal strength (and is thus independent of i), the two approaches are identical.

It should be noted that k can be negative as well as positive such that desired conditions improve increases the ranking factor whereas undesired conditions decrease it.

It will be clear to the person skilled in the art, that many other specific methods and functions can be used for determining the preference value and the ranking factor. It will also be clear that many other factors can be used in determining the preference value including the absolute measured pilot signal strength or a pilot signal quality measure.

A ranking factor is determined for each cell of a plurality of cells. The higher the ranking factor, the more the cell serves subscriber units in a desired way, i.e. as single serving cells or as hand over cells in handovers with few cells. A low ranking factor indicates that the cell is involved in handovers with many cells or interferes with other cells. Therefore, the pilot signal transmit power is increased for cells with high ranking factors and reduced for cells with low ranking factors.

In the preferred embodiment, the adjustment or setting of pilot signal transmit powers is subject to further conditions as described below.

Firstly, a lower threshold on the pilot signal transmit power is determined for each cell such that a minimum coverage area of that cell is guaranteed. The minimum threshold can be determined by drive testing which can be performed under single pilot conditions. This ensures that the pilot signals are always sufficiently strong to ensure that the cells overlap such that there are no gaps or holes in the coverage of the communication system.

Secondly, the adjustment is subject to an upper threshold on the pilot signal transmit powers. This upper threshold is set such that the base station will not power up beyond the capacity of the transmitter power amplifier. The upper threshold is set taking into account the intended power increase of the pilot signals as well as the associated power increase of all other transmissions affected by the increased pilot signal transmit power. Specifically, in UMTS the transmitted power for each traffic channel depends to some extent on the transmitted pilot power signal and therefore an upper threshold is set in response to the number of traffic channels during max loading of the cell and the dependency of the transmit power of each traffic channel on the pilot signal transmit power.

Figures 5, 6:
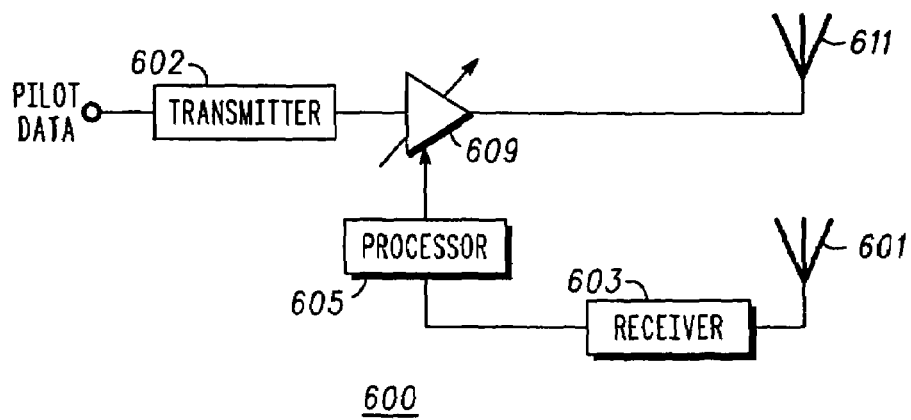
FIG. 5 illustrates an example of a ranking of cells according to a ranking factor determined in accordance with an embodiment of the invention.
FIG. 6 illustrates an apparatus for setting pilot signal transmit power in accordance with an embodiment of the invention.

FIG. 5 illustrates an example of a ranking of cells according to a ranking factor determined in accordance with an embodiment of the invention.

The table of FIG. 5 shows the pilot number, ranking factor, whether the pilot power can be considered for reduction, the proposed change in pilot power and the pilot powers before and after the adjustment step. Note that the change in pilot power is limited to 2 dBW in a single adjustment step for this example.

In the example of FIG. 5, it can be seen that the pilot signal transmit power of the cells having a positive ranking factor is increased with a value dependent on their ranking factor. It can also be seen that the pilot signal transmit power of most cells having a negative ranking factor is reduced by a value dependent on the ranking factor. However, for cells having pilot 88 and 152, power cannot be reduced any further without coverage being reduced below what is acceptable, and consequently the pilot signal transmit power is maintained unchanged.

In the preferred embodiment, the described method is iterated and the pilot signal transmit powers of a different subset of cells is set in consecutive iterations dependent on the interdependency between cells. Specifically, if the pilot signal transmit power of a cell is set, the interference to other cells is changed and the conditions for neighbour cells may change. Therefore, for cells with strong interdependency only one cell is adjusted in each iteration. This permits the impact of the adjustment to be taken into account before a decision is made on whether to change the pilot signal transmit power of the impacted cell.

FIG. 6 illustrates an apparatus 600 for setting pilot signal transmit power in accordance with an embodiment of the invention.

An antenna 601 receives measurements from subscriber units. The antenna 601 is connected to a receiver 603 which despreads, demodulates and decodes the received measurement data. This data is fed to a processor 605, which executes the method as previously described. Pilot data is fed to a transmitter 607, which spreads and modulates the pilot signal for transmission. The transmitter 607 is connected to an adjustable power amplifier 609, which is connected to an antenna transmitting the pilot signal.

The processor can be implemented anywhere in the system or can be distributed between a plurality of components. However, in the preferred embodiment it is situated in the RNC. The processor will typically receive measurement data from a plurality of receivers and will adjust the transmit power of a plurality of power amplifiers.

An advantage of the invention is that it provides a very efficient system for setting pilot signal transmit powers such that pilot signal interference is reduced while maintaining coverage.

Another advantage of the invention is that the transmit pilot signal transmit powers can be set based on simple measurements, which can be performed by standard subscriber units.

Another advantage of the invention is that it can be used in an operational network and does not require drive testing or simulation.

Another advantage of the invention is that it allows adjustment of the pilot signal transmit power based on the conditions in an active communication system. The ranking may thus be based on the conditions experienced by subscriber units in an active network taking into consideration all in a live system such as geographical distribution of all subscriber units in the network and the actual traffic distribution used. This obviates the need for many assumptions, which are required in dimensioning of a system based on drive tests or simulation.

The invention claimed is:

1. A method of setting pilot signal transmit powers in a CDMA cellular communication system comprising the steps of:
   receiving pilot signal measurements from at least one measurement receiver and from a plurality of locations, the pilot measurements relating to pilot signals from more than one cell;
   for a plurality of cells, evaluating the plurality of pilot signal measurements and for each pilot signal measurement determining a preference value dependent on the pilot signal measurement and a handover state of the measurement receiver during measurement, and determining a ranking factor for each cell in response to the preference values of the measurements;
   ranking the cells according to the ranking factor; and
   setting the pilot signal transmit power of at least one cell in response to the ranking of the cells.

2. A method of setting pilot signal transmit powers as claimed in claim 1 wherein the preference value of each measurement depends on pilot signal measurement of the pilot signal of the cell being ranked relative to pilot signals measurements for other cells.

3. A method of setting pilot signal transmit powers as claimed in claim 1 wherein the preference value is dependent on the time interval between measurement reports for that measurement receiver, such that a longer time interval increases the preference value for a desired handover state but lowers the preference value for a non-desired handover state.

4. A method of setting pilot signal transmit powers as claimed in claim 1 wherein the ranking factor of a cell is determined as an averaged value of all the preference values calculated.

5. A method of setting pilot signal transmit powers as claimed in claim 1 wherein an adjustment of the pilot power depends on the ranking factor associated with the at least one cell.

6. A method of setting pilot signal transmit powers as claimed in claim 1 wherein an adjustment of pilot signal power is subject to a first threshold dependent on a minimum coverage area for that cell.

7. A method of setting pilot signal transmit powers as claimed in claim 6 wherein the adjustment of pilot signal power is subject to a threshold higher than the first threshold dependent on a maximum power capacity of the power amplifier serving that cell and dependent upon an intended power increase of the pilot signals as well as the associated power increase of all other transmissions affected by the increased pilot signal transmit power.

8. A method of setting pilot signal transmit powers as claimed in claim 1 wherein the at least one measurement receiver is a plurality of subscriber units operable to communicate with the cellular network.

9. A method of setting pilot signal transmit powers as claimed in claim 1 wherein the steps are iterated and the pilot signals are dynamically updated during system operation.

10. A method of setting pilot signal transmit powers as claimed in claim 9 wherein the pilot signal transmit powers of a different subset of cells is set in consecutive iterations dependent on the interdependency between cells.

11. An apparatus for setting pilot signal transmit powers in a CDMA cellular communication system comprising:
   means for receiving pilot signal measurements from at least one measurement receiver and from a plurality of locations, the pilot measurements relating to pilot signals from more than one cell;
   means for evaluating the plurality of pilot signal measurements and for each pilot signal measurement determining a preference value dependent on the pilot signal measurement and a handover condition of the measurement receiver during measurement for each cell, and determining a ranking factor for each cell of a plurality of cells, in response to the preference values of the measurements;
   means for ranking the cells according to the ranking factor; and
   means for setting the pilot signal transmit power of at least one cell in response to the ranking of the cells.

12. An apparatus for setting pilot signal transmit powers as claimed in claim 11 wherein the preference value of each measurement depends on pilot signal measurement of the pilot signal of the cell being ranked relative to pilot signals measurements for other cells.

13. An apparatus for setting pilot signal transmit powers as claimed in claim 11 wherein the preference value is dependent on the time interval between measurement reports for that measurement receiver, such that a longer time interval increases the preference value for a desired handover state but lowers the preference value for a non-desired handover state.

14. An apparatus for setting pilot signal transmit powers as claimed in claim 11 wherein the ranking factor of a cell is determined as an averaged value of all the preference values calculated.

15. An apparatus for setting pilot signal transmit powers as claimed in claim 11 wherein an adjustment of the pilot power depends on the ranking factor associated with the at least one cell.

16. An apparatus for setting pilot signal transmit powers as claimed in claim 11 wherein an adjustment of pilot signal power is subject to a first threshold dependent on a minimum coverage area for that cell.

17. An apparatus for setting pilot signal transmit powers as claimed in claim 16 wherein the adjustment of pilot signal power is subject to a threshold higher than the first threshold dependent on a maximum power capacity of the power amplifier serving that cell and dependent upon an intended power increase of the pilot signals as well as the associated power increase of all other transmissions affected by the increased pilot signal transmit power.

18. An apparatus for setting pilot signal transmit powers as claimed in claim 11 wherein the at least one measurement receiver is a plurality of subscriber units operable to communicate with the cellular network.

* * * * *